United States Patent [19]

Hesseler

[11] 4,168,178
[45] Sep. 18, 1979

[54] ASBESTOS-FREE BITUMINOUS COMPOSITION

[75] Inventor: William F. Hesseler, Lebanon, N.J.

[73] Assignee: GAF Corporation, New York, N.Y.

[21] Appl. No.: 873,487

[22] Filed: Jan. 30, 1978

[51] Int. Cl.$^2$ .......................... C08K 3/04; C08K 7/14; C08L 95/00
[52] U.S. Cl. .............................. 106/278; 106/281 R; 106/282; 106/DIG. 2
[58] Field of Search .................... 106/282, 278, 281 R

[56] References Cited

U.S. PATENT DOCUMENTS

| | | | |
|---|---|---|---|
| 2,178,770 | 11/1939 | Zaisser | 106/282 |
| 3,567,660 | 3/1971 | Winkler | 106/282 |
| 3,782,988 | 1/1974 | Alexander et al. | 106/282 |

*Primary Examiner*—J. Ziegler
*Attorney, Agent, or Firm*—Walter C. Kehm; Joshua J. Ward

[57] ABSTRACT

Asbestos-free bituminous composition comprising 3–12 wt% high structure carbon black dispersed in asphalt cutback.

6 Claims, No Drawings

ASBESTOS-FREE BITUMINOUS COMPOSITION

BACKGROUND OF THE INVENTION

Bituminous compositions comprising asphalt cutback asbestos fiber and particulate fillers such as limestone are well known in the roofing industry for use in caulking, flashing and as roofing cement and/or waterproofing agents in roofing applications. While such compositions are generally satisfactory in terms of providing satisfactory results, the asbestos fibers used in such compositions are known to be carcinogenic. Thus the manufacture of formulations containing asbestos fibers represents difficult safety problems for the manufacturer.

Accordingly, it would be desireable to replace the asbestos fibers in bituminous compositions of the type mentioned above with other materials which would provide a satisfactory product without the health hazards associated with manufacture of asbestos containing products. Unfortunately, this apparently cannot be achieved satisfactorily with the use of other fibers or particulate fillers previously suggested for use in such formulations.

SUMMARY OF THE INVENTION

It is therefore, an object of the invention to provide the satisfactory asbestos-free bituminous composition for use in various roofing applications including caulking, flashing, cementing, waterproofing, etc.

In accordance with the invention, an asbestos-free bituminous composition is provided which comprises between about 3 and about 12 wt% high structure carbon black dispersed in asphalt cutback said asphalt cutback comprising:

(a) between about 50 and about 90 wt% asphalt having a ring and ball softening point between about 80° and about 240° F. and a penetration at 77° F. between about 5 and about 200 decimillimeters (dmm) as measured in accordance with ASTM D-5-73.

(b) between about 10 and about 50 wt% solvent for said asphalt.

In preferred embodiments, the carbon black has a dibutyl phthalate absorption value at least about 200 cc/100 g and the composition also contains between about 10 and about 45 wt% particulate filler with the optional addition of another 0.5–5 wt% fiber filler.

DETAILED DESCRIPTION OF THE INVENTION

As mentioned above, the bituminous composition of the invention is an asbestos-free composition comprising between about 3 and about 12 wt% high structure carbon black dispersed in asphalt cutback with the asphalt cutback comprising between about 50 and about 90 wt% asphalt having a ring and ball softening point between about 80° and about 240° F. and a penetration at about 77° F. between about 5 and about 200 dmm. and between about 10 and 50 wt% solvent for the asphalt.

Asphalt suitable for use in material of the invention may in general, be any of the asphalts normally found suitable for roofing purposes provided the necessary physical characteristics are met. Suitable asphalts may for instance be natural asphalt or may be asphalt obtained as a residue in petroleum or coal tar refining, etc.

The solvent used in forming the asphalt cutback used in the invention is conveniently any of the solvents normally used for asphalt cutback with mineral spirits being preferred. Mineral spirit is generally considered to include hydrocarbon solvents boiling within the range of 150° to 190° F. and having a closed flashpoint over 78° F. Other suitable solvents include for instance, Stoddard solvent, cutting naphtha, etc. While the amount of solvent in the asphalt cutback may be broadly within the range given above, it will be understood that the amount of solvent used in a particular composition will depend, at least in part, upon the particular solvent and asphalt used as well as the temperature at which the composition of the invention is to be used. If desired, a portion of the solvent content of the asphalt cutback may be added during blending of the composition of the invention rather than during manufacture of the asphalt cutback.

Carbon black suitable for use in compositions of the invention includes any high structure carbon black with carbon black having a dibutyl phthalate absorption value of at least about 200 cc per 100 grams of carbon black being preferred. Suitable carbon black may be prepared by any of the usual methods of manufacturing carbon black. Such methods include thermal decomposition of hydrocarbons to produce furnace blacks, exothermal decomposition of acetylene to produce acetylene blacks, etc. Specific techniques for obtaining high structure blacks are well known to those skilled in the manufacture of carbon black.

High structure carbon black is used in compositions of the invention in amounts between about 3 and about 12% by weight based on total composition with compositions containing between about 3 and about 8% carbon black being preferred, especially if additional filler materials are used.

Even though replacement of asbestos by other fibers in bituminous compositions of the type contemplated herein has not proven satisfactory, it has been found possible by use of highly structured carbon black as described herein, to produce satisfactory substitute bituminous compositions which are substantially free of asbestos. By "asbestos-free," "substantially free of asbestos," etc., are meant compositions containing either no asbestos or at most very small amounts such as up to about 1 wt% asbestos fiber. Complete absence of any asbestos fiber is preferred.

In formulating compositions of the invention, the amount of carbon black used may, as mentioned above, vary from about 3 to about 12 wt% of the total composition.

In a preferred embodiment, the composition of the invention also includes between about 10 and about 45 wt% particulate filler. When such additional filler is used, the amount of carbon black required may generally be on the lower rather than the upper end of the range mentioned above with total carbon black content of between about 3 and about 8% being preferred with the use of additional filler material. Suitable fillers include particulate fillers of the type generally considered suitable for bituminous compositions. Such fillers preferably have particle sizes in the general range of between about 0.02 and about 600 microns and include for instance limestone, perlite fines, expanded perlite, crushed perlite, glass microspheres, sand stone, dust, slate powder, low or medium structure carbon black, alumina, etc.

In addition to the particulate filler mentioned above, additional amounts between about 1 and about 3% by weight based on total composition of fibers other than asbestos may be used and are frequently preferred. Suitable fibers for this purpose include for instance glass fibers, cellulosic fibers such as newsprint, cotton, polyesters, polyamides (e.g. nylon), polyolefins (e.g., polypropylene or polyethylene) etc. When used, glass fibers are preferably at least 3 microns in diameter to avoid the suspected carcinogenic potential of glass fibers of less than 3 micron diameter.

While not necessary to the practice of the invention, water is frequently present in compositions of the invention in small amounts either as a result of water present on or as part of the various ingredients of the composition of the invention, or as a result of water added during composition of the invention. Water in amounts up to about 5 wt% of the total composition is not considered harmful for most applications of such compositions.

In addition to ingredients of compositions of the invention discussed above, such compositions may also contain other ingredients such as surfactants, elastomers, (e.g., butyl rubber) etc., especially those which are conventional in similar products. Where present, such extraneous ingredients preferably comprise less than about 10 wt% of the composition.

While the various mechanisms by which high structure carbon black enhances asphaltic material to provide suitable composition of the invention are not completely understood, it is believed that the high structure carbon black serves several functions. For instance, the high structure carbon black absorbs asphaltic oils and solvents for control of viscosity. Further, when properly formulated, there is very little, if any, settling or separation of the liquid or solid phases of compositions of the invention. The high structure carbon black also serves to provide body to the compositions of the invention for ease of application by troweling, etc. The high structure black also provides reinforcement structure to the composition before, during and after application to roof structures. This factor is essential with increasing material temperature to resist flow during and after application. Bituminous compositions of the invention are generally smooth and uniform and readily applicable with trowels over the temperature range of about 50° F. to about 125° F. Further, in most, if not all respects, compositions of the invention provide performance characteristics at least as good as the characteristics of conventional asbestos-containing bituminous compositions.

Compositions of the invention may be formed in any suitable manner with conventional mixing in the manner normally used for preparation of asphaltic roofing compositions being preferred. Relatively low shear mixing equipment such as a Ross Planetary Mixer, conventional, single or double paddle mixers with thick blades operating at relatively low speeds (e.g., 40 to 90 rpm) are for instance suitable. Mixing temperatures frequently range between about 60° and about 150° F. and mixing times between about 20 and about 45 minutes. In general, high shear mixing for prolonged periods of time should be avoided to avoid breakdown of the carbon black structure into distinct particles. Substantial breakdown of the carbon black during mixing results in dispersion of the carbon black into distinct particles, thus destroying the high structure characteristics of the black and rendering it unsuitable for the compositions of the invention. As mentioned above, carbon black incorporated in compositions of the invention must be high structure carbon black, preferably with dibutyl phthalate absorption values in excess of 200 cc per 100 grams carbon black.

The following examples are intended to illustrate the invention without limiting the scope thereof.

EXAMPLE I

Bituminous cements having the compositions shown in Table I below were prepared by blending the ingredients in a Ross low shear planetary mixer. In each case the asphalt cutback was preheated to the temperature range of 110°–150° F. to improve flow. After the asphalt cutback was placed in the mixer, the required amount of fiber filler, if any, was added and the mixer turned on. The structured carbon black was next added in four steps or portions of the required amounts with the mixer being turned off while the black was being added so as to reduce dust. The mixer was then turned on until the carbon black was wetted and incorporated into the mix. After the carbon black was thoroughly incorporated into the mix, the particulate filler was added while continuing the mixing. Overall mixing time was in the range of 20 to 45 minutes for each composition.

Base asphalt used in the asphalt cutback was petroleum asphalt derived from Mid-Continent crude oil and having a ring and ball softening point of about 140° F. and a penetration at 77° F. of about 37 dmm. The carbon black had a dibutyl phthalate absorption of 240 cc per 100 grams of carbon black with a surface area as determined via the nitrogen adsorption method of 99 square meters per gram of carbon black and a stiff paste oil absorption of 3–4 cc per gram of carbon black. The various compositions formulated in this manner were as shown in Table 1 below.

TABLE I
BITUMINOUS CEMENT COMPOSITIONS

| Composition | Ingredient | | Wt. % |
|---|---|---|---|
| A | Asphaltic Cutback (60% asphalt by weight 40% Solvent by weight) | = | 88.8% |
|   | High Structure Carbon Black | – | 11.2 |
|   |   |   | 100.0% |
| B | Asphalt Cutback (60% asphalt by weight-40% Solvent by weight) | = | 56.6% by wt. |
|   | High Structure Carbon Black | = | 5.6 |
|   | Limestone Filler | = | 37.8 |
|   |   |   | 100.0% |
| C | Asphalt Cutback (60% asphalt by weight-40% solvent by weight) | = | 87.8% by wt. |
|   | High Structure Carbon Black | – | 11.2 |
|   | Fiber Glass Filler (Avg. range, 3–6½ microns diameter ⅛" length) | = | 1.0 |
|   |   |   | 100.0% |
| D | Asphalt Cutback (60% asphalt by weight-40% solvent by weight) | – | 79.6% by wt. |
|   | High structure Carbon Black | = | 6.2 |
|   | Crushed Perlite Fines Filler | = | 13.3 |
|   | Fiber Glass Filler (Avg. range, 3–6½ microns dia., ⅛" length) | = | 0.9 |
|   |   |   | 100.0% |
| E | Asphalt Cutback (60% asphalt by weight-40% solvent by weight) | = | 69.7% by wt. |
|   | High structure Carbon Black | = | 6.2 |
|   | #160 Mica Filler | = | 23.3 |
|   | Fiber Glass Filler (Avg. range, 3–6½ microns dia., ⅛" length) | = | 0.8 |
|   |   |   | 100.0% |
| F | Asphalt Cutback (60 asphalt by weight-40% solvent by weight) | = | 54.1% by wt. |
|   | High Structure Carbon Black |   | 5.5 |
|   | Limestone Filler |   | 39.6 |

TABLE I-continued
BITUMINOUS CEMENT COMPOSITIONS

| Composition | Ingredient | | Wt. % |
|---|---|---|---|
| | Fiber Glass Filler (Avg. range, 3-6½ microns dia., ⅛" length) | = | 0.8 |
| | | | 100.0% |
| G | Asphalt Cutback (70% asphalt by weight-30% solvent by weight) | = | 52.4% by wt. |
| | High Structure Carbon Black | = | 3.0 |
| | Expanded Perlite 2½-3#/ft³ bulk density) | = | 2.9 |
| | Limestone Filler | = | 39.5 |
| | Fiber Glass Filler (Avg. range, 3-6½ microns dia, ⅛" length) | = | 0.5 |
| | Cutting Naptha | = | 1.7 |
| | | | 100.0% |
| H | Asphaltic Cutback (60% Asphalt 40% Solvent) | = | 54.1% by wt. |
| | High Structure Carbon Black | = | 5.5 |
| | Limestone | = | 39.6 |
| | Fiber Glass Filler (Avg. range, 3-6½ microns diameter ⅛" length) | = | 0.8 |
| | | | 100.0% |

EXAMPLE 2

In order to evaluate the physical characteristics of the compositions prepared in Example 1 the following tests were carried out on Composition H of Example 1.

Tests:
a. Clarvoe Consistency @ 77° F. seconds=4.4 seconds (Brass Rod+100 grams) Required:=3.0 to 6.0 seconds b. Strength of Lap Test: Specs. SS-C-00153A Interim Revision of Federal Specs. SS-C-153. Strength of Lap After 1 Hr. at Room Temp. Lbs/Inch—100 —Required Min. Lbs/Inch 8.0 c. Flow Test: 140° F. for 5 Hrs. on the Vertical

Test Description—1/16 inch to ⅛ inch wet film thickness on asphaltic coated base sheet is allowed to stand in a horizontal position for a period of sixty minutes at room temperature and not exposed to the sun. Suspend the test panel vertically in an oven at a temperature of 140° F. for a period of 5 hours. Remove the panels from oven and examine for blistering. Then measure the distance of slide.

Required—The cement shall show no blistering and not more than ¼ inch of sagging or slipping of the bituminous cement.

Test Result—There were no blisters and no slipping or sagging of the bituminous cement after 5 hours at 140° F.

d. Low Temperature Test—0° C. or 32° F.

Test Description—1/16 inch to ⅛ inch thickness of wet film is doctored on aluminum metal, allowed to dry for one hour at room temperature in a horizontal position (not in the direct rays of the sun) and then in the oven for 5 hours at 140° F. After drying cycle, cool test panels to room temperature and immerse in a water bath at 0° C. or 32° F. for one hour. After the test period, remove and bend around a one inch mandrel at a bend rate requiring two seconds to complete.

Required—There shall be no cracking of the cement and no separation of cement from the metal.

e. Bituminous Cement Application (1) Elevated Temperature

Application Conditions—Surface temperature maintained on vertical coated asphaltic base sheet substrate is 110° F. using GE sunlamp.

Temperature of bituminous cement is 110° F.

Required—There shall be no dripping, stringing, pulling away of the bituminous cement from the trowel along with good to excellent coverage of the bituminous cement onto the substrate.

After application to the substrate at approximately ⅛ inch wet thickness, there shall be no flowing or sagging of the bituminous cement after three hours at 110° F.

Criterion—Experimental material has to be as good as, if not better than, existing asbestos bituminous cement control.

Test Result—Material passes. There was no dripping, stringing, etc., off the trowel and there was good to excellent coverage delivered to the substrate. There was no flow or sagging of the bituminous cement after the three hours test at 110° F.

Criterion: The experimental material was as good as the control.

In addition to the above tests, Composition H was found to be as easy as conventional asbestos-containing bituminous cement to spread with a trowel on a horizontal asphaltic base sheet while both the base sheet and the composition were maintained at 50°-55° F.

From the above examples, it can be seen that bituminous composition of the invention is entirely satisfactory in all respects as a replacement for conventional asbestos containing compositions.

While the invention has been described above with respect to certain embodiments thereof, it will be understood by those skilled in the art that various changes and modifications may be made without departing from the spirit and scope of the invention.

What is claimed is:

1. An asbestos free bituminous composition comprising between about 3 and about 12 wt% high structure carbon black having a dibutyl phthalate absorption value of at least about 200 cc per 100 grams of carbon black, said carbon black being dispersed in asphalt cutback comprising:
   (a) between about 50 and about 90 wt% asphalt having a ring and ball softening point between about 80 and about 240° F. and a penetration at 77° F. between about 5 and about 200 decimillimeters; and
   (b) between about 10 and about 50 wt% solvent for said asphalt.

2. Composition according to claim 1 wherein the composition also contains between about 10 and about 45 wt% particulate filler.

3. Composition according to claim 2 wherein said particulate filler has a size range between about 0.02 and about 600 microns.

4. Composition according to claim 3 which also contains between about 0.5 and about 5 wt% fiber filler.

5. Composition according to claim 3 wherein the carbon black is present in amounts between about 3 and about 8 wt% of the composition.

6. Composition according to claim 1 which also contains between about 0.5 and about 5 wt% fiber filler.

* * * * *